(12) United States Patent
Bachmann et al.

(10) Patent No.: US 6,366,738 B1
(45) Date of Patent: Apr. 2, 2002

(54) CAMERA WITH PRINT QUANTITY DESIGNATION FOR EACH EXPOSURE PROVIDES PRINT COST TOTAL

(75) Inventors: Reinhold Bachmann, Rochester; Roger A. Fields, Pittsford; Stephen G. Malloy Desormeaux, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/510,446

(22) Filed: Feb. 21, 2000

(51) Int. Cl.[7] .............................................. G03B 17/24
(52) U.S. Cl. ...................................... 396/297; 396/311
(58) Field of Search ................................ 396/297, 299, 396/311, 6, 374; 186/61, 52; 235/421, 59 BC, 60 M, 91 L, 61 PK, 63 R

(56) References Cited

U.S. PATENT DOCUMENTS

| | | | | |
|---|---|---|---|---|
| 4,714,962 A | | 12/1987 | Levine | |
| 5,250,789 A | * | 10/1993 | Johnsen | 235/83 |
| 5,361,871 A | * | 11/1994 | Gupta et al. | 186/61 |
| 5,574,520 A | | 11/1996 | Ishihara | |
| 5,583,610 A | | 12/1996 | Yoshikawa | |
| 5,694,634 A | | 12/1997 | Patton et al. | |
| 5,710,954 A | | 1/1998 | Inoue | |
| 5,778,265 A | * | 7/1998 | Seki | 396/311 |
| 5,808,723 A | * | 9/1998 | Klees | 355/40 |
| 5,950,024 A | * | 9/1999 | Saito et al. | 396/311 |
| 5,970,264 A | * | 10/1999 | Funaki | 396/299 |
| 6,198,526 B1 | * | 3/2001 | Ohtsuka | 355/40 |
| 6,205,296 B1 | * | 3/2001 | Hamada et al. | 396/311 |

* cited by examiner

Primary Examiner—David M. Gray
(74) Attorney, Agent, or Firm—Roger A. Fields

(57) ABSTRACT

A camera for successively capturing images of subjects, in which respective print quantity designations indicate the number of prints to be made for each one of the captured images, includes print cost totaller that calculates a print cost total which is a total cost of prints to be made for every one of the captured images, and updates the print cost total to make it current each time a print quantity designation is used for a particular captured image.

21 Claims, 8 Drawing Sheets

CAMERA WITH PRINT QUANTITY DESIGNATION FOR EACH EXPOSURE PROVIDES PRINT COST TOTAL

CROSS REFERENCE TO RELATED APPLICATION

Reference is made to commonly assigned copending application Serial No. 09/499,812, entitled CAMERA THAT RECORDS PRINT QUANTITY DESIGNATION ON FILM FOR EACH EXPOSURE, AND HAS PRINT QUANTITY TOTALLING and filed Feb. 8, 2000 in the name of Stephen G. Malloy Desormeaux, James W. Fulmer and Robert Hills.

FIELD OF THE INVENTION

The invention relates generally to the field of photography, and in particular to image capture cameras in which there is provided a print quantity designation of how many prints are to be made for each captured image.

BACKGROUND OF THE INVENTION

New cameras for the new worldwide "Advanced Photo System" ("APS") can give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The "APS" camera records the choice of print format magnetically and/or optically on one longitudinal edge of the filmstrip for each exposed frame on the filmstrip. The standard encodement on film for the "H" format is the binary 0, 0, i.e. no recorded data bits. The standard encodement on film for the "P" format is either the binary 0, 1 or the binary 1, 0, i.e. one recorded data bit. The standard encodement on film for the "C" format is the binary 1, 1, i.e. two recorded data bits. To make the prints, the photofinisher's equipment reads the optical or magnetic encodements on film and automatically prints each print in the encoded "C", "H" or "P" format. A print having a "C" format is typically 4×6 inches. A print having a "H" format is typically 4×7 inches. And a print having a "P" format is typically 4×10 inches or 4×11.5 inches. No matter which format is selected in the camera, "C", "H" or "P", the exposed frames on the filmstrip are always in the "H" format. This allows re-prints to be made in any of the three formats rather than just in the selected format.

The "APS" camera can include a print quantity selector that is manually operated to provide a print quantity designation of how many prints are to be made for a particular exposed frame on the filmstrip. The print quantity designation is recorded magnetically on one longitudinal edge of the filmstrip for the particular exposed frame.

THE CROSS-REFERENCED APPLICATION

The cross-referenced application Serial No. 09/499,812, entitled CAMERA THAT RECORDS PRINT QUANTITY DESIGNATION ON FILM FOR EACH EXPOSURE, AND HAS PRINT QUANTITY TOTALLING discloses a camera for successively capturing images of subjects, which has a print quantity selector that can be manually operate d to provide various print quantity designations of the number of prints to be made for each one of the captured images. A print reset can be manually operated to change the print quantity designations used for the captured images simultaneously to the same print quantity designation. A print quantity totaller is connected to the print quantity selector and to the print reset for updating a print quantity total which is the sum of the number of prints to be made for the captured images, both when the print quantity selector is used and when the print reset is used.

SUMMARY OF THE INVENTION

A camera for successively capturing images of subjects, in which respective print quantity designations indicate the number of prints to be made for each one of the captured images, is characterized in that:

a print cost totaller calculates a print cost total which is a total cost of prints to be made for every one of the captured images, and updates the print cost total to make it current each time a print quantity designation is used for a particular captured image.

The print cost totaller calculates a print quantity total which is a sum of the number of prints to be made for every one of the captured images, updates the print quantity total to make it current each time a print quantity designation is used for a particular captured image, and applies the updated print quantity total and a unit print cost to calculate the print cost total.

DETAILED DESCRIPTION OF THE INVENTION

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
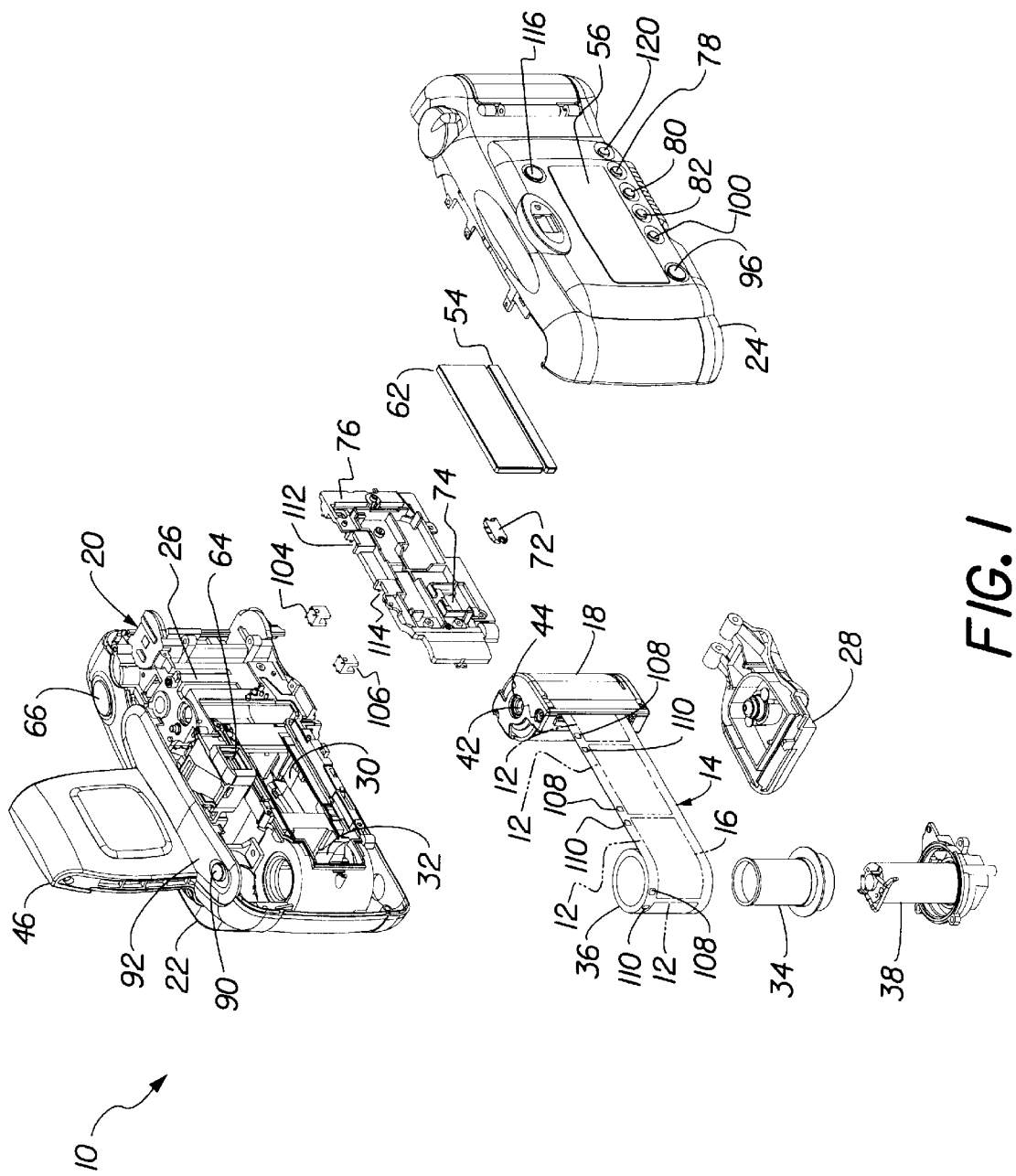
FIG. 1 is a rear exploded perspective view of a dual film exposure, electronic exposure camera consistent with a preferred embodiment of the invention.
Figure 2:
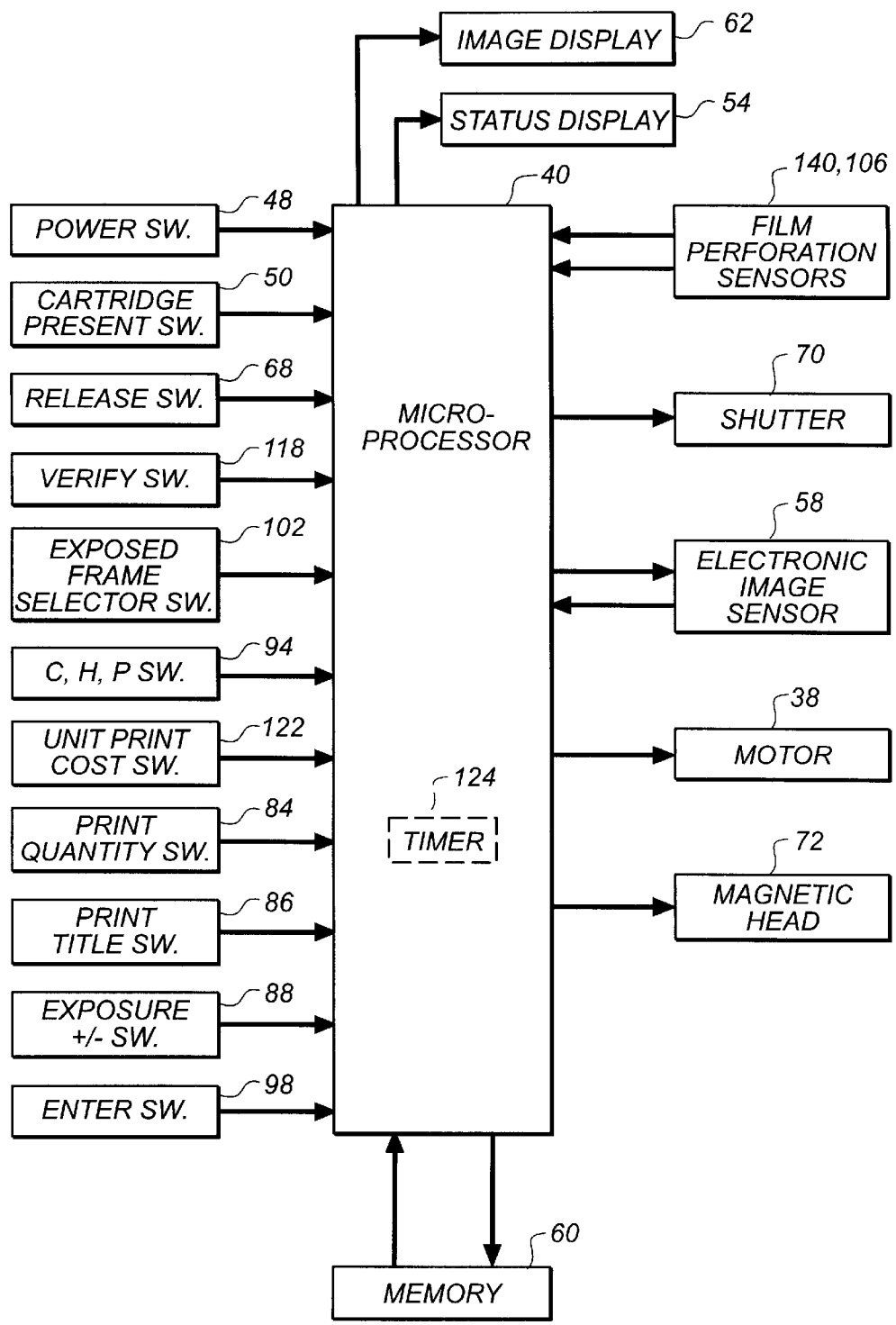
FIG. 2 is a block diagram of various components of the camera.

Referring now to the drawings, FIGS. 1 and 2 show a motorized film advance camera 10 for exposing latent images on successive frames 12 of a known "Advanced Photo System" ("APS") filmstrip 14. The filmstrip 14 has a transparent magnetic overlay which gives it magnetic recording capacity to store various user-selected information along a track 16 adjacent each exposed film frame 12, and it is normally housed in an opaque film cartridge 18. Typically, the filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open backframe opening 30 at which the respective frames 12 of the filmstrip 14 are temporarily positioned one at a time to be exposed, and an exposed film take-up chamber 32 that contains a film take-up spool 34 which is incrementally rotated following each film exposure to wind the most-recently exposed one of the film frames onto an exposed film roll 36 on the spool (and to position a fresh unexposed film frame at the backframe opening 30). When the film take-up spool 34 is incrementally rotated, the filmstrip 14 is advanced forward one frame increment which is slightly greater than a frame width. A drive motor 38 resides inside the film take-up spool 34 for incrementally rotating the spool to advance the filmstrip 14 forward one frame increment, and its operation is controlled by a known microcomputer 40. When substantially the entire length of the filmstrip 14 is exposed, i.e. the total number of available film frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the cartridge.

To magnetically record the user-selected information along the track 16 adjacent each exposed film frame 12, the motor 38 must be actuated after the exposed film length is rewound rearward into the film cartridge 18 to continuously rotate the film take-up spool 34 in order to advance the exposed film length forward. Then, the motor 38 is actuated to continuously rotate the film spool inside the film cartridge 18 in order to rewind the film length with the recorded information rearward into the cartridge, and the door 28 is pivoted open to remove the cartridge from the cartridge receiving chamber 26.

A known electronic flash unit 46 for flash assisted exposures is flipped up from partially covering the front cover part 22 to uncover a taking lens (not shown) preparatory to using the camera 10. See FIG. 1. Flipping up the flash unit 46 closes a normally open power switch 48 connected to the microcomputer 40 to electrically power "on" the camera 10. See FIG. 2.

Figure 3:
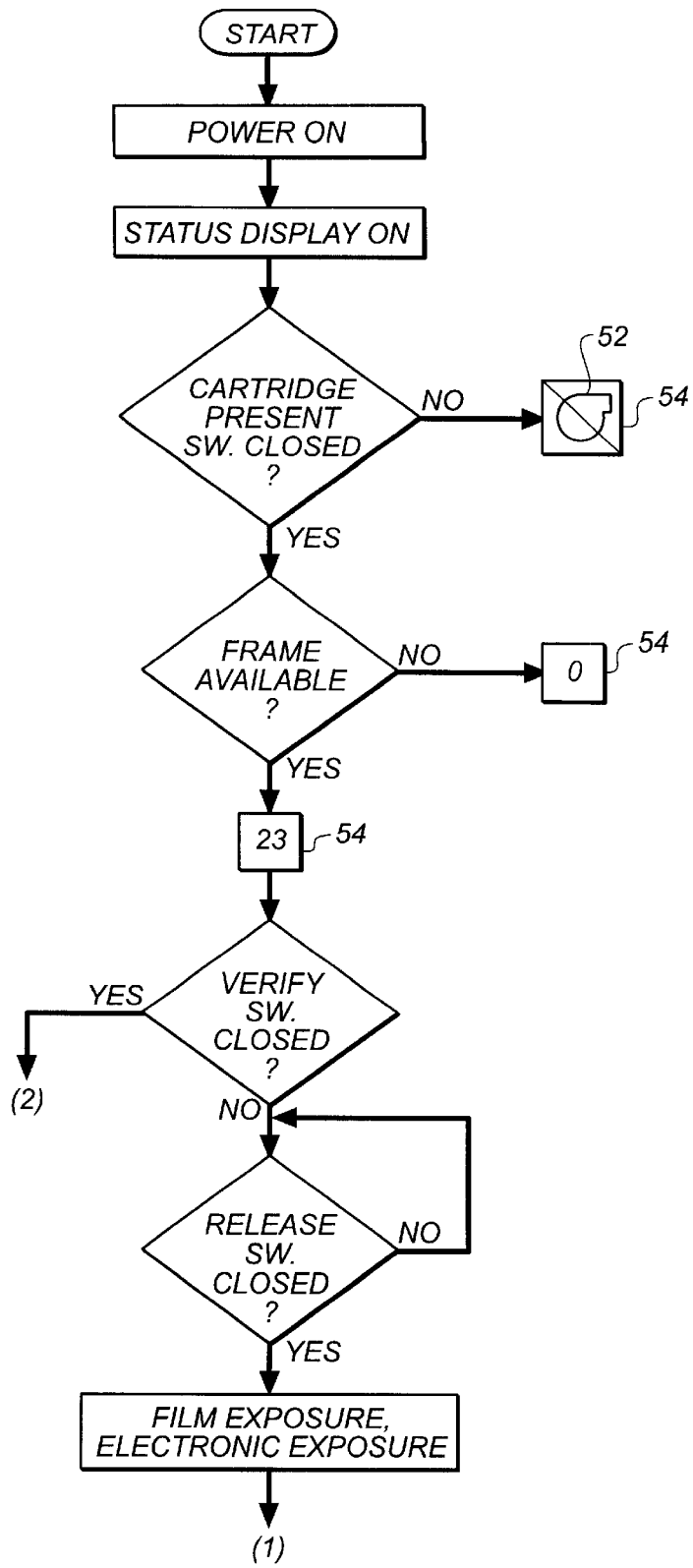
FIGS. 3, 4 and 5 is a flow chart depicting operation of the camera to illustrate the invention.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and is located behind a window 56 in the rear cover part 24. See FIG. 1. If the camera 10 is powered "on" and the cartridge present switch 50 is closed, a visible cartridge loaded indication (not shown) is shown in the status display 54.

A known electronic image sensor 58, for example a CCD sensor with integrated shuttering capability or a CMOS sensor with integrated shuttering capability, is connected to the microcomputer 40 to form a different electronic image each time one of the unexposed film frames 12 is exposed. The respective electronic images correspond to the latent images on the exposed film frames 12, are each stored in a memory 60 connected to the microcomputer 40, and can be shown one at a time in a known image display 62 such as a color LCD connected to the microcomputer. The image display 62 is located next to the status display 54, behind the window 56 in the rear cover part 24. The memory 60 has storage capacity for storing at least 40 electronic images, since the filmstrip 14 is available in 15-exposure, 25-exposure, and 40-exposure lengths.

A viewfinder 64 for viewing a subject to be photographed is located on the main body part 20. See FIG. 1.

To take a picture, a shutter release button 66 on the front cover part 22 is manually depressed which in turn closes a normally open release switch 68 connected to the microcomputer 40. See FIGS. 1 and 2. The closed switch 68 triggers momentary opening of a known normally closed shutter 70 to expose a latent image on the film frame 12 at the backframe opening 30, and to excite the electronic image sensor 58 to form an electronic image substantially simultaneously with exposure of the latent image. The taking lens (not shown) can be used to focus an image of the subject being photographed, for the electronic image sensor 58 as well as for the filmstrip 14, or a separate lens an be provided for the electronic image sensor. These alternatives are indicated in prior art U.S. Pat. No. 5,710,954 issued Jan. 20, 1998.

A magnetic head 72 is mounted within an opening 74 in a film pressure platen 76 for magnetically recording the user-selected information along the track 16 adjacent each one of the exposed film frames 12. The film pressure platen 76 serves to support each film frame 12 flat for exposure at the backframe opening 30.

The user-selected information, as is known, can be a selected print quantity number preferably ranging from 0–9 prints, a selected (optional) print title in English and other languages, a selected (optional) print exposure correction +/−, and a selected "APS" print format "C" (classic), "H" (HDTV) or "P" (panoramic), for example. A "C" format print is usually 4×6 inches, a wider "H" format print is often 4×7 inches, and a much wider "P" format print is either 4×10 inches or 4×11.5 inches. The selected print quantity number, print title, and print exposure correction, and the selected "APS" print formats "C", "H" or "P", for every one of the exposed film frames 12 are stored in the memory 60. Individual visible indications of the selected print quantity number, print title, and print exposure correction for any one of the exposed film frames 12 can be seen in the status display 54. A visible indication of the selected "APS" print format "C", "H" or "P" for any one of the exposed film frames 12 can be seen in the image display 62 (preferably superimposed on the electronic image shown in the image display). Respective print quantity, title and exposure correction buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 in order to add new print quantity number, title and exposure correction designations to the memory 60 for a most-recently exposed one of the film frames 12 and to change the print quantity number, title and exposure correction designations stored in the memory 60 for any one of the exposed film frames 12 to new designations for the same exposed film frame. A format selection button 90 is provided on a top plate 92, and when manually depressed one or more times closes a normally open C, H, P switch 94 the same number of times. The C, H, P switch 94 is connected to the microcomputer 40 in order to add a new C, H or P designation to the memory 60 for a most-recently exposed one of the film frames 12 and to change the C, H or P designation stored in the memory 60 for any one of the exposed film frames 12 to a new designation for the same exposed film frame. To enter the newly selected information in the memory 60, an enter button 96 on the rear cover part 24 must be manually depressed which in turn closes a normally open enter switch 98 connected to the microcomputer 40.

If the print quantity switch 84 is not closed one-to-ten times (to capacity for storing at least 40 electronic images, since the filmstrip 14 is available designate the print quantity number to be 1, 2, 3, 4, 5, 6, 7, 8, 9, or 0 prints) for a most-recently exposed one of the exposed film frames 12, the default print quantity number for the most-recently exposed frame is "1", or alternatively it can be the same as the last-made print quantity selection. The default print quantity "1" can be stored in the memory 60.

An exposed frame selector button 100 is provided on the rear cover part 24, and when manually depressed one or more times closes a normally open exposed frame selector switch 102 connected to the microcomputer 40 the same number of times, to change the electronic image and the "APS" print format "C", "H" or "P" shown in the image display 62 for any one of the exposed film frames 12, and to change the print quantity number, print title, and print exposure correction shown in the status display 54 for the same exposed film frame, to the electronic image and the user-selected information for another one of the exposed film frames. This is possible because the electronic images that match the exposed film frames, and the user-selected information for the exposed film frames, are stored in the memory 60. Thus, one can effectively scroll through the electronic images and the user-selected information stored in the memory 60 for the exposed film frames 12, and successively see the electronic images and the user-selected information for any one of the exposed film frames in the status and image displays 54 and 62. This is done in preparation for manually depressing the print quantity, title and exposure correction buttons 78, 80 and 82 and the format selection button 90 to change the user-selected information stored in the memory 60 for any one of the exposed film frames 12.

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count (the number of available film frames 12) stored in the memory 60 by "1", each time the filmstrip 14 is advanced forward a frame increment and the most-recently exposed one of the film frames is wound onto the exposed film roll 36 on the film take-up spool 34. The frame count begins with "15", "25" or "40" depending whether the filmstrip 40 has a 15-exposure, 25-exposure, or 40-exposure length.

A verify (print preview) button 116 is provided on the rear cover part 24, and when manually depressed closes a normally open verify switch 118 connected to the microcomputer 40. See FIGS. 1 and 2. The closed verify switch 118 causes the electronic image and the "APS" print format "C", "H" or "P" stored in the memory 60 for the most-recently exposed one of the film frames 12 to be shown in the image display 62, and it causes the print quantity number, print title, and print exposure correction stored in the memory for the same exposed film frame to be shown in the status display 54. If, however the exposed frame selector switch 102 had been closed to change the electronic image and the "APS" print format "C", "H" or "P" shown in the image display 62 and to change the print quantity number, print title, and print exposure correction shown in the status display 54, from that for the most-recently exposed one of the film frames to that for an earlier exposed one of the film frames, then the closed verify switch 118 causes the electronic image and the user-selected information for the earlier exposed film frame to be shown in the displays.

Print Cost Total

A unit print cost selector button 120 is provided on the rear cover part 24, and when manually depressed one-to-three times quickly in succession closes a normally open unit print cost switch 122 connected to the microcomputer 40 the same number of times, to select which ones of the "APS" print formats "C", "H" and "P" are to be assigned individual unit print costs. The "unit print cost" is the photofinisher's cost per print to the consumer. Pressing the unit cost selector button 120 only once and then pausing selects the "C"-print format. Pressing the unit cost selector button 120 twice and then pausing selects the "H"-print format. Pressing the unit cost selector button 120 three times and then pausing selects the "T"-print format. Then, when the unit print cost button 120 is continuously held depressed to maintain the unit cost switch 122 closed, visible indications of increasing unit print costs, for example from $0.01 to $0.99, successively appear in the status display 54 together with a visible indication of the selected "C"-, "H"- or "P"-print format. Releasing the unit print cost button 122 selects the unit print cost (which is visible in the status display 54 at that moment) for the selected print format. The selected unit print cost is stored in the memory 60 for the selected "C"-, "H"- or "P"-print format.

After the unit print cost is selected for a first one of the "APS" print formats and is stored in the memory 60, the sequence can be repeated to store a selected unit print cost for a second one of the "APS" print formats in the memory. Then, the sequence can be repeated to store a selected unit print cost for the remaining one of the "APS" print formats in the memory 60. An example of a unit print cost for each "C" format print is $0.10, for each "H" format print is $0.16, and for each "4" format print is $0.46.

Alternatively, the selected unit print cost stored in the memory 60 can be the same for each one of the "C"-, "H"- and "P"-print formats. In this instance, the unit print cost selector button 120 must be manually depressed four times quickly in succession to close the unit print cost switch 122 the same number of times, to select that the three print formats be assigned the same unit print cost. Then, when the unit print cost button 120 is continuously held depressed to maintain the unit cost switch 122 closed, visible indications of increasing unit print costs, for example from $0.01 to $0.99, successively appear in the status display 54 together with a visible indication of the three print formats. Releasing the unit print cost button 122 selects the unit print cost (which is visible in the status display 54 at that moment) for the three print formats. The selected unit print cost is stored in the memory 60. An example of an identical unit print cost for each one of the "C"-, "H"- and "P"-print formats is $0.28 per print.

The microcomputer 40 operates as a print cost totaller for calculating a print cost total which is a total cost of prints to be made for every one of the exposed film frames 12. The print cost total existing at any given time is stored in the memory 60 either (1) as the sum of respective print cost subtotals stored in the memory for the "C"-, "H"- and "P"-print formats, as shown in the status display 54 in FIG. 7, when a different unit print cost is selected for each one of the three print formats, or (2) only as a total amount (no subtotals) for the "C"-, "H"- and "P"-print formats, when the selected unit print cost is identical for the three print formats. The print cost total stored in the memory 60 is updated via the microcomputer 40 each time a print quantity number is used for a particular one of the exposed film frames 12.

When the microcomputer 40 calculates the print cost total, it must first determine a print quantity total which is the sum (addition) of the number of prints to be made for every one of the exposed film frames 12. The print quantity total existing at any given time is stored in the memory 60 either (1) as the sum of respective print quantity subtotals stored in the memory for the "C"-, "H"- and "P"-print formats, as shown in the status display 54 in FIG. 7, when a different unit print cost is selected for each one of the three print formats, or (2) only as a total amount (no subtotals) for the "C"-, "H"- and "P"-print formats, when the selected unit print cost is identical for the three print formats. The print quantity total stored in the memory 60 is updated via the microcomputer 40 each time a print quantity number is used for a particular one of the exposed film frames 12.

Figure 6:
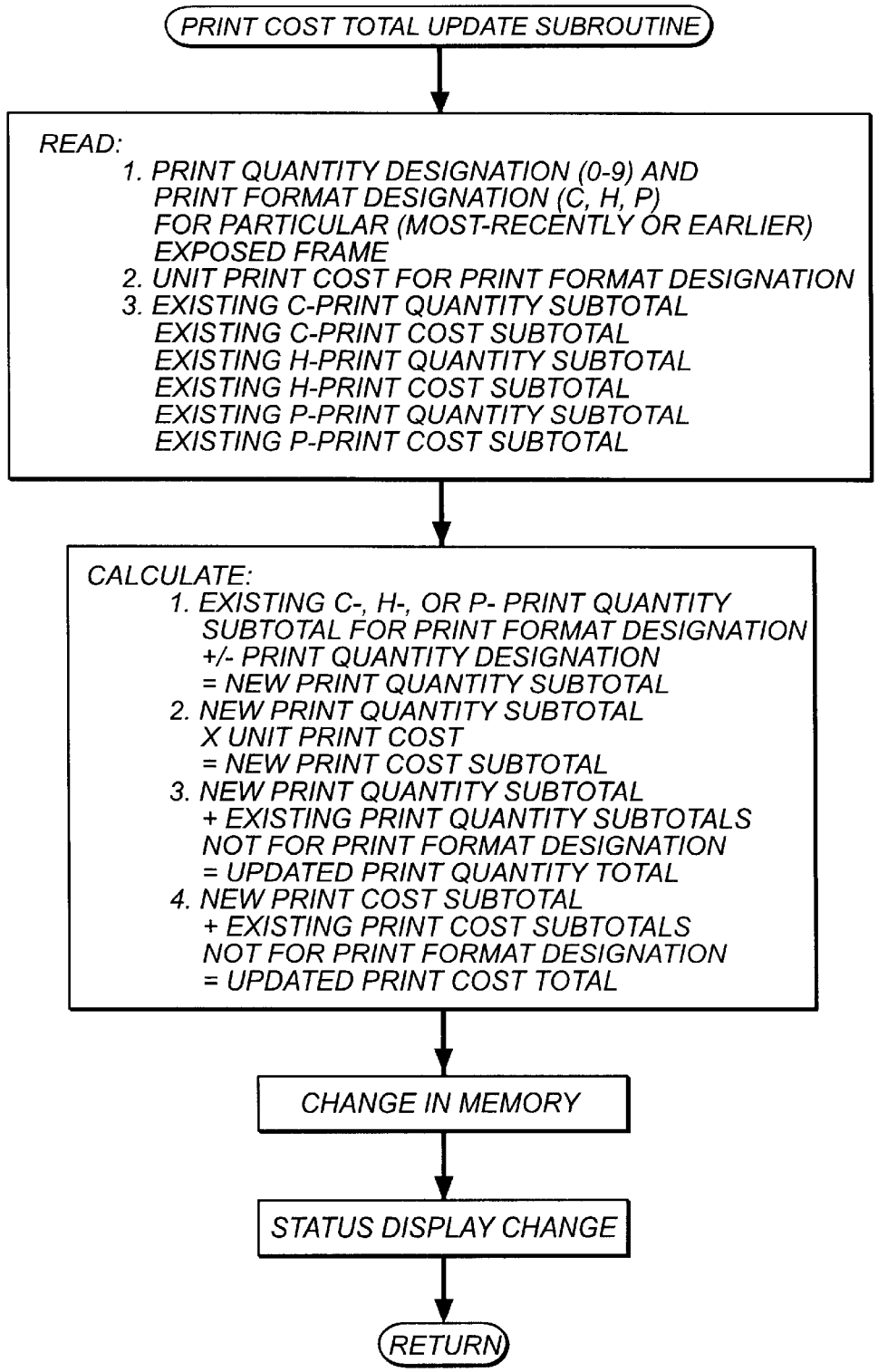
FIG. 6 is a flow chart of a one example of a subroutine for updating a print cost total.
Figure 7:
FIG. 7 is a view of a display which shows the print cost total.

If the separate print quantity and print cost totals existing at any given time are stored in the memory 60 as individual sums of respective print quantity subtotals and respective print cost subtotals stored in the memory for the "C"-, "H"- and "T"-print formats, as shown in the status display 54 in FIG. 7, because a different unit print cost is selected for each one of the three print formats, the separate print quantity and print cost totals are updated via the microcomputer 40 according to a print cost total subroutine shown in FIG. 6. If the separate print quantity and print cost totals existing at any given time are stored in the memory 60 only as individual total amounts (no subtotals) for the "C"-, "H"- and "P"-print formats, because the selected unit print cost stored in the memory is identical for the three print formats, the print quantity and print cost totals are updated via the microcomputer 40 according to a print cost total subroutine shown in FIG. 8.

Operation

Figure 4:
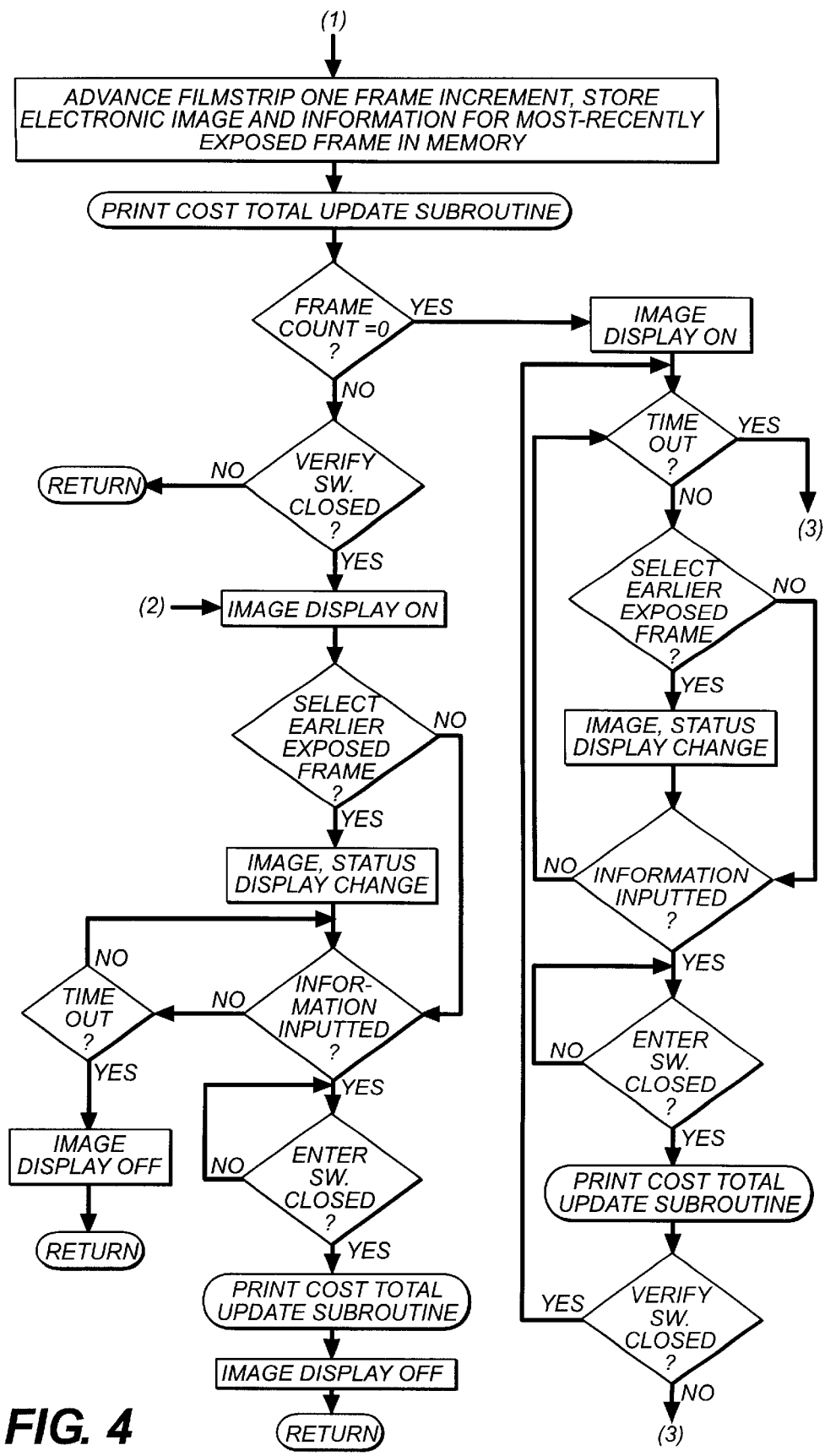
Figure 5:
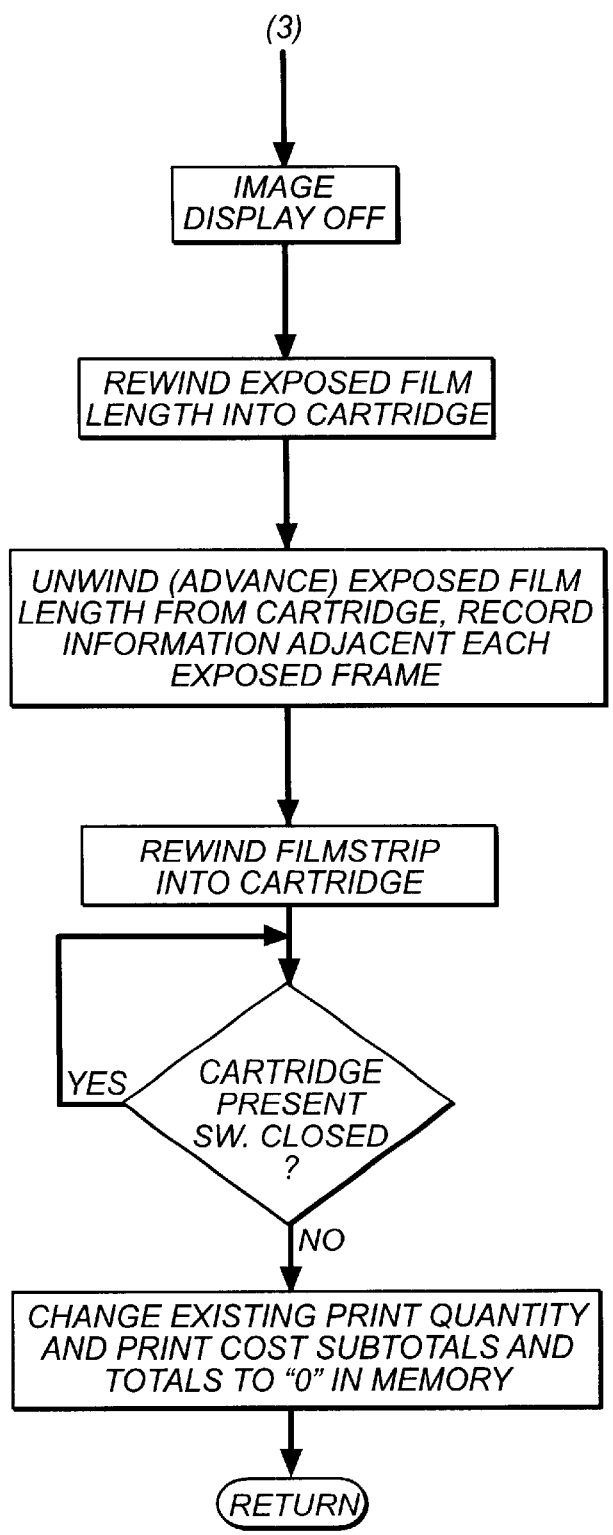

The operation of the camera 10 to illustrate the invention is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count (the number of available film frames 12) stored in the memory 60, as well as the print total in the memory.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively an earlier exposed one) of the film frames 12. Also, the status display 54 now shows the user-selected information stored in the memory 60 for the same exposed film frame, except that the visible indication of the selected "APS" print format "C", "H" or "P" is shown in the image display 62 superimposed on the electronic image.

7. If conversely in FIG. 3, the verify switch 118 remains open, and the release switch 68 is not closed within an allotted time, e.g. 150 seconds, determined by a timer 124 in the microcomputer 40, the camera 10 is powered "off" for battery conservation.

8. If conversely in FIG. 3, the verify switch 118 remains open, and the release switch 68 is closed within the allotted time, e.g. 150 seconds, determined by the timer 124 in the microcomputer 40, because a picture is being taken, a latent image is exposed on the film frame 12 at the backframe opening 30 and the electronic image sensor 58 is excited to form an electronic image which matches the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image and the user-selected information for the most-recently exposed frame 12 are stored in the memory 60, and the frame count stored in the memory is decremented by "1", for example to "22".

10. Then, in FIG. 4 either one of the print cost total subroutines shown in FIGS. 6 and 8 (and separately described later), are performed via the microcomputer 40 to update the existing print cost and print quantity totals stored in the memory 60 for every one of the film frames 12 exposed so far.

11. If next in FIG. 4 the frame count in the memory 60 is greater than "0", the verify switch 114 can be closed.

12. If then in FIG. 4 the verify switch 118 is not closed within the allotted time, e.g. 150 seconds, determined by the timer 124 in the microcomputer 40, or alternatively the release switch 68 is not closed within the same time, the camera 10 is powered "off" for battery conservation.

13. If conversely in FIG. 4 the verify switch 118 is closed within the allotted time (as in FIG. 3), e.g. 150 seconds, determined by the timer 124 in the microcomputer 40, the image display 62 is turned "on" to show the electronic image stored in the memory 60 corresponding to the latent image on the most-recently exposed one (or alternatively an earlier exposed one) of the film frames 12. Also, the status display 54 now shows the user-selected information for the same exposed film frame, except that the visible indication of the selected "APS" print format "C", "H" or "P" is shown in the image display 62 superimposed on the electronic image.

14. If next in FIG. 4 the exposed frame selector switch 102 is not closed within the allotted time, e.g. 150 seconds, determined by a timer 124 in the microcomputer 40, and none of the user-selected information switches 84, 86, 88 and 94 are closed within a brief time, e.g. 10 seconds, determined by the timer, the image display 62 is turned "off". The camera 10 including the status display 54 remains "on."

15. If conversely in FIG. 4 the exposed frame selector switch 102 is not closed within the allotted time, e.g. 150 seconds, determined by the timer 124 in the microcomputer 40, and at least one of the user-selected information switches 84, 86, 88 and 94 is closed within the brief time, e.g. 10 seconds, determined by the timer, then when the enter switch 98 is closed, the electronic image and the new selected information for the most-recently exposed one of the film frames 12 are stored in the memory 60 in place of the previously stored information for the same exposed film frame, one of the print cost total update subroutines shown in FIGS. 6 and 8 (and separately described later) are performed via the microcomputer 40 to update the existing print cost and print quantity totals stored in the memory 60, and the image display 62 is turned "off".

16. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94 is closed within the brief time, e.g. 10 seconds, and the enter switch 98 is closed, the electronic image and the new selected information for the earlier exposed film frame 12 are stored in the memory 60 in place of the previously stored information for the same exposed film frame, one of the print cost total update subroutines shown in FIGS. 6 and 8 (and separately described later) may be performed via the microcomputer 40 to update the existing print cost and print quantity totals stored in the memory 60, and the image display 62 is turned "off".

17. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "APS" print format "C", "H" or "P" is shown in the image display 62 superimposed on the electronic image. The image display 62 is turned "on" in this instance (as compared with the other instance in FIG. 4 that it is turned "on") without having to first close the verify switch 118.

18. If next in FIG. 4 the exposed frame selector switch 102 is not closed within the allotted time, e.g. 150 seconds, and none of the user-selected information switches 84, 86, 88 and 94 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Then, the door 28 is pivoted open to remove the film cartridge 18 from the cartridge receiving chamber 26. When the film cartridge 18 is removed, the cartridge present switch 50 opens and the microcomputer 40 changes the existing print cost and print quantity totals stored in the memory 60 to "0". Also, any existing print cost and print quantity subtotals stored in the memory 60 are changed to "0".

19. If conversely in FIG. 4 the exposed frame selector switch 102 is not closed within the allotted time, e.g. 150 seconds, and at least one of the user-selected information switches 84, 86, 88 and 94 is closed within the brief time, e.g. 10 seconds, the image display 62 remains "on." Then when the enter switch 98 is closed, one of the print cost total update subroutines shown in FIGS. 6 and 8 (and separately described later) may be performed via the microcomputer 40 to update the existing print cost and print quantity totals stored in the memory 60. If the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Then, the door 28 is pivoted open to remove the film cartridge 18. When the film cartridge 18 is removed, the cartridge present switch 50 opens and the microcomputer 40 changes the existing print cost and print quantity totals stored in the memory 60 to "0". Also, any existing print cost and print quantity subtotals stored in the memory 60 are changed to "0".

20. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) is shown in the status and image displays 54 and 62. Then, when at least one of the user-selected information switches 84, 86, 88 and 94 is closed within the brief time, e.g. 10 seconds, and the enter switch 98 is closed, one of the print cost total update subroutines shown in FIG. 6 (and separately described later) may be performed via the microcomputer 40 to update the existing print cost and print quantity totals stored in the memory 60. If the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Then, the door 28 is pivoted open to remove the film cartridge 18. When the film cartridge 18 is removed, the cartridge present switch 50 opens and the microcomputer 40 changes the existing print cost and print quantity totals stored in the memory 60 to "0". Also, any existing print cost and print quantity subtotals stored in the memory 60 are changed to "0".

21. If conversely in FIG. 4 the verify switch 118 is closed within the allotted time, e.g. 150 seconds, go back to step 18 above.

Print Cost Total Update Subroutine—FIG. 6

The print cost total update subroutine shown in FIG. 6 is performed via the microcomputer 40 to update the existing print cost and print quantity totals stored in the memory 60 for every one of the film frames 12 exposed so far. This version is performed when the existing print cost and print quantity totals are stored in the memory 60 as individual sums of respective print quantity subtotals and respective print cost subtotals stored in the memory for the "APS" "C"-, "H"- and "P"-print formats (because a different unit print cost is selected for each one of the three print formats). See the status display 54 in FIG. 7.

1. First in FIG. 6 the microcomputer 40 reads the single designated print quantity number 0–9 and the single designated "APS" print format "C", "H" or "P" stored in the memory 60 for a particular exposed film frame 12 (either a most-recently exposed film frame or an earlier exposed film frame). Also, the microcomputer 40 reads the single designated unit print cost $0.01–$0.99 stored in the memory 60 for the same "C"-, "H"- or "P"-print format, and it reads the existing C-, H- and P-print quantity and print cost subtotals stored in the memory for the respective "C"-, "H"- and "P"-print formats. See the status display 54 in FIG. 7.

2. Next in FIG. 6 the microcomputer 40 performs its calculations to update the existing print quantity and print cost totals to new print quantity and print cost totals. First the single designated print quantity number 0–9 and the existing C-, H- or P-print quantity subtotal for the single designated "C"-, "H"- or "P"-print format are summed to obtain a new C-, H- or P-print quantity subtotal (in place of the existing print quantity subtotal) for the same "C"-, "H"- or "P" print format. If, for example, the existing C-, H- or P-print quantity subtotal is "3" for three film frames 12 exposed so far, and the designated print quantity number for a most-recently exposed film frame is "2", the new C-, H- or P-print quantity subtotal would be 3 plus 2=5. If, alternatively, the existing C-, H- or P-print quantity subtotal is "6" for three film frames 12 exposed so far, and the designated print quantity number for an earlier exposed film frame has been reduced from "2" to "1" (via the print quantity switch 84), the new C-, H- or P-print quantity subtotal would be 6 minus 15. Then, the new print quantity subtotal and the unit print cost for the single designated "C"-, "H"- or "P"-print format are multiplied to obtain a new print cost subtotal (in place of the existing print cost subtotal) for the same "C"-, "H"- or "P"-print format. If, for example, the new print quantity subtotal is "5" and the unit print cost is $0.10 per print, the new print cost subtotal is $0.50. See FIG. 7. The new print quantity subtotal and the remaining two existing print quantity subtotals are summed to obtain an updated print quantity total. The new print cost subtotal and the remaining two existing print cost subtotals are summed to obtain an updated print cost total.

3. Then in FIG. 6 the print quantity and print cost subtotals and totals are changed in the memory 60 and the status display 54 is changed to reflect this update.

Figure 8:
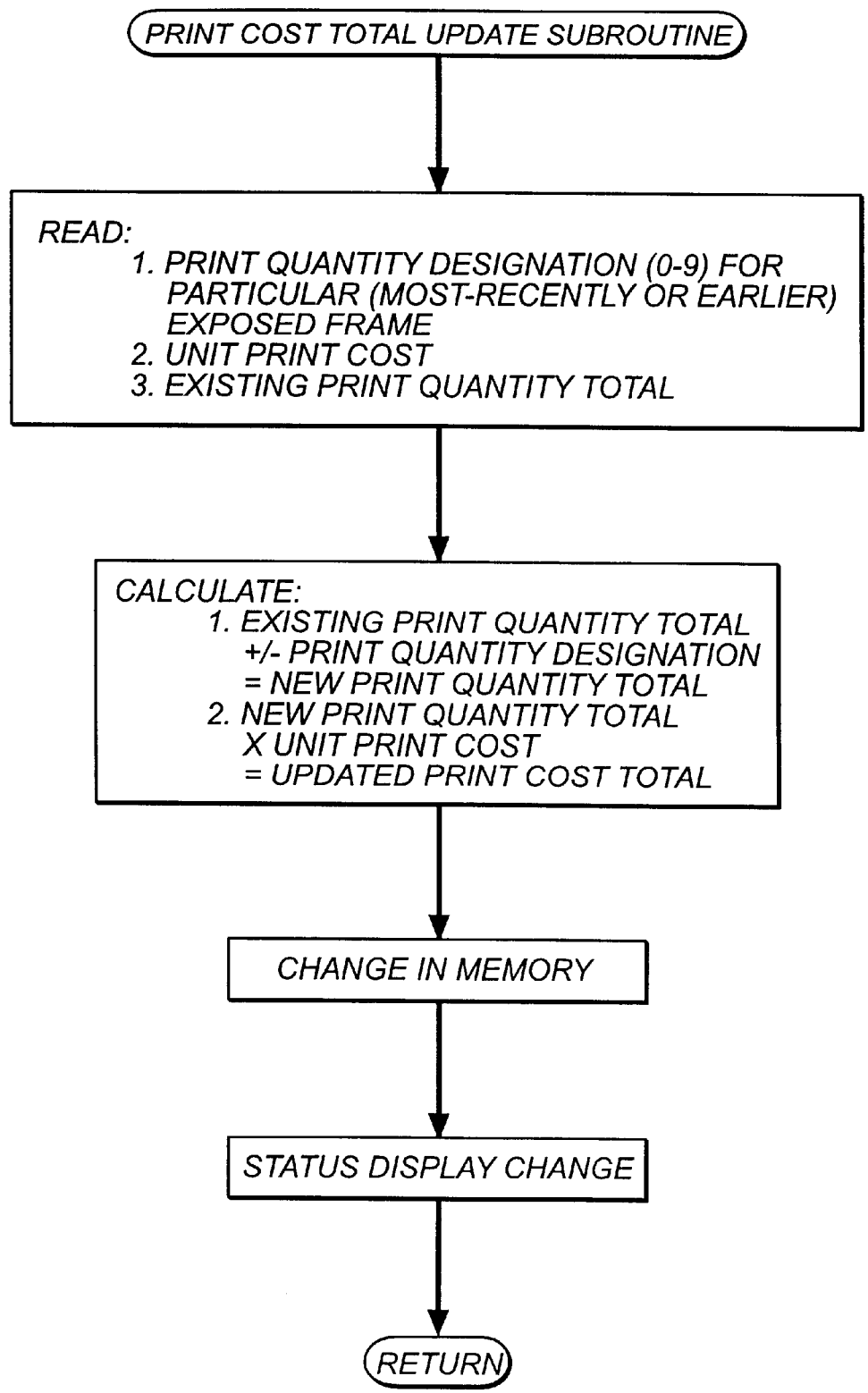
FIG. 8 is a flow chart of another example of a subroutine for updating the print cost total.

Print Cost Total Update Subroutine—FIG. 8

The print cost total update subroutine shown in FIG. 8 is performed via the microcomputer 40 to update the existing print cost and print quantity totals stored in the memory 60 for every one of the film frames 12 exposed so far. This version is performed when the existing print quantity and print cost totals are stored in the memory 60 only as individual total amounts (no subtotals) for the "APS" "C"-, "H"- and "P"-print formats (because the selected unit print cost stored in the memory is identical for the three print formats).

1. First in FIG. 8 the microcomputer 40 reads the single designated print quantity number 0–9 and the single designated "APS" print format "C", "H" or "T" stored in the memory 60 for a particular exposed film frame 12 (either a most-recently exposed film frame or an earlier exposed film frame). Also, the microcomputer 40 reads the one designated unit print cost $0.01–$0.99 stored in the memory which is the same for the "C"-, "H"- and "P"-print formats, and it reads the existing print quantity total stored in the memory for the three print formats.

2. Next in FIG. 8 the microcomputer 40 performs its calculations to update the existing print quantity and print cost totals to new print quantity and print cost totals. First the single designated print quantity number 0–9 and the existing print quantity total are summed to obtain a new print quantity subtotal which is the updated print quantity total. If, for example, the existing print quantity total is "3" for three film frames 12 exposed so far, and the designated print quantity number for a most-recently exposed film frame is "2", the new print quantity total would be 3 plus 2=5. If, alternatively, the existing print quantity subtotal is "6" for three film frames 12 exposed so far, and the designated print quantity number for an earlier exposed film frame has been reduced from "2" to "1" (via the print quantity switch 84), the new print quantity total would be 6 minus 1=5. Then, the new print quantity total and the unit print cost for the "C" "H"- and "P"-print formats are multiplied to obtain an updated print cost total for the three print formats. If, for example, the new print quantity total is "5" and the unit print cost is $0.28 per print, the new print cost total is $1.40.

3. Then in FIG. 6 the print quantity and print cost totals are changed in the memory 60 and the status display 54 is changed to reflect this update.

The invention has been described with reference to a preferred embodiment. However, it will be appreciated that variations and modifications can be effected by a person of ordinary skill in the art without departing from the scope of the invention. For example, when in FIG. 4 the enter switch 98 is not closed within an allotted time, e.g. 150 seconds, determined by the timer 124 in the microcomputer 40, and alternatively the release switch 68 is not closed within the same time, the camera 10 could be powered "off" for battery conservation.

PARTS LIST 10. camera
12. film frames
14. filmstrip
16. track
18. film cartridge
20. main body part
22. front cover part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spoolend
46. electronic flash unit
48. power switch
50. cartridge present switch
52. no-cartridge warning
54. status display 56. window
58. electronic image sensor
60. memory
62. image display
64. viewfinder
66. shutter release button
68. release switch
70. shutter
72. magnetic head
74. opening
76. film pressure platen
78. print quantity button
80. print title button
82. exposure correction button
84. print quantity switch
86. print title switch
88. exposure correction switch
90. format selection button
92. top plate
94. C, H, P switch
96. enter button
98. enter switch
100. exposed frame selector button
102. exposed frame selector switch
104. film perforation sensor
106. film perforation sensor
108. film perforation
110. filn perforation
112. pocket
114. pocket
116. verify button
118. verify switch
120. unit print cost selector button
122. unit print cost switch
124. timer

What is claimed is:

1. A camera for successively capturing images of subjects, in which respective print quantity designations indicate the number of prints to be made for each one of the captured images, is characterized in that:
a print cost totaller calculates a print cost total which is a total cost of the number of prints to be made for all the captured images, and updates the print cost total to make it current each time a print quantity designation is used for a particular captured image.

2. A camera as recited in claim 1, wherein any one of a series of unit print costs are selectable, a unit print cost selector can be manually operated to select any one of the series of selectable unit print costs, and said print cost totaller applies a selected unit print cost to calculate said print cost total.

3. A camera as recited in claim 2, wherein a memory connected to said print cost totaller stores said print cost total and said selected unit print cost, and said print cost totaller determines the print cost total and the selected unit print cost stored in said memory when said print cost total is to be updated.

4. A camera as recited in claim 1, wherein said print cost totaller calculates a print quantity total which is a sum of the number of prints to be made for all the captured images, updates said print quantity total to make it current each time a print quantity designation is used for a particular captured image, and applies an updated print quantity total to calculate said print cost total.

5. A camera as recited in claim 4, wherein any one of a series of unit print costs are selectable, a unit print cost selector can be manually operated to select any one of the series of selectable unit print costs, and said print cost totaller multiplies a selected unit print cost and an updated print quantity total to update said print cost total.

6. A camera as recited in claim 1, wherein a print format selector can be manually operated to select any one of a group of selectable different-type print formats to provide respective print format designations for every one of the captured images, and said print cost totaller calculates respective print cost subtotals for the selected different-type print format designations within said group.

7. A camera as recited in claim 6, wherein said print cost totaller multiplies a print quantity total of prints to be made according to any one of said selected different-type format designations and a selected unit print cost for the same format designation to calculate the print cost subtotal for that format designation.

8. A camera as recited in claim 6, wherein said print cost totaller sums said print cost subtotals to update said print cost total.

9. A camera as recited in claim 1, wherein a display connected to said print cost totaller displays said print cost total each time the print cost total is updated.

10. A camera for successively capturing images of subjects, is characterized in that:
a print quantity selector provides respective print quantity designations of the number of prints to be made for a most-recently captured image and for any one of earlier captured images; and
a print cost totaller calculates a print cost total which is a total cost of the number of prints to be made for all the captured images, and is connected to said print quantity selector to update said print cost total each time a print quantity designation is used for a most-recent captured image or for an earlier captured image, whereby a running cost total will be maintained.

11. A camera for exposing latent images of subjects on successive frames of a filmstrip, in which a print quantity selector provides respective print quantity designations of the number of prints to be made for each one of the exposed frames, is characterized in that:
a print cost totaller calculates a print cost total which is a total cost of the number of prints to be made for all the captured images, and is connected to said print quantity selector to update said print cost total to make it current each time a print quantity designation is used for a particular exposed frame; and
a display is connected to said print cost totaller for displaying the print quantity designation used for a particular exposed frame and for displaying said print quantity total.

12. A camera as recited in claim 11, wherein said display displays said print cost total each time said print cost totaller updates the print cost total.

13. A camera as recited in claim 11, wherein an exposed frame selector can be manually operated to select any one of the exposed frames, said print quantity selector is connected to said exposed frame selector to change the print quantity designation for any one of the exposed frames that is selected with said exposed frame selector, and said print cost totaller updates said print cost total when said print quantity selector changes the print quantity designation for any one of the exposed frames that is selected with said exposed frame selector.

14. A camera as recited in claim 11, wherein a cartridge receiving chamber is adapted to receive a film cartridge for the filmstrip, and a cartridge present sensor for determining whether the film cartridge is present in or removed from said cartridge receiving chamber is connected to said print cost totaller to change said print cost total to "0" when the film cartridge is removed from said cartridge receiving chamber.

15. A method of operating a camera for successively capturing images of subjects, in which respective print quantity designations indicate the number of prints to be made for each one of the captured images, said method comprising the steps of:

calculating a print cost total which is a total cost of the number of prints to be made for all the captured images; and updating the print cost total to make it current each time a print quantity designation is used for a particular captured image.

16. A method of cumulating a print cost total in an image capture camera comprises the steps of:

successively capturing images of subjects;

storing respective print quantity designations of the number of prints to be made for each one of the captured images; and updating a print cost total which is a total cost of the number of prints to be made for all the captured images each time a print quantity designation is used for a particular captured image, whereby a running cost total will be maintained.

17. A method as recited in claim 16, further having the step of displaying the print cost total each time it is updated.

18. A method as recited in claim 16, wherein a print format selector can be manually operated to select any one of a group of selectable different-type print formats to provide respective print format designations for every one of the captured images, and the print cost total is updated by summing respective print cost subtotals which are for the selected different-type print format designations within the group.

19. A method as recited in claim 18, further having the step of displaying the print cost total and the print cost subtotals each time the print cost total is updated by summing the print cost subtotals.

20. A method as recited in claim 18, wherein a print quantity total of prints to be made according to any one of the selected different-type format designations and a selected unit print cost for the same format designation are multiplied to calculate a print cost subtotal for that format designation.

21. A method as recited in claim 16, wherein the print cost total is updated by multiplying a selected unit print cost and a print quantity total which is a sum of the number of prints to be made for every one of the captured images.

* * * * *